US006786462B1

(12) United States Patent
Bland

(10) Patent No.: US 6,786,462 B1
(45) Date of Patent: Sep. 7, 2004

(54) RV SEWAGE LINE STABILIZING DEVICE

(76) Inventor: Leslie N. Bland, 3124 E. Rialto Ave., Fresno, CA (US) 93726-1602

( * ) Notice: Subject to any disclaimer, the term of this patent is extended or adjusted under 35 U.S.C. 154(b) by 0 days.

(21) Appl. No.: 10/444,116

(22) Filed: May 23, 2003

(51) Int. Cl.[7] .............................................. A47B 97/00
(52) U.S. Cl. .......................... 248/505; 248/910; 248/75
(58) Field of Search ................................ 248/503, 504, 248/505, 500, 510, 910, 507, 75, 79, 310, 312

(56) References Cited

U.S. PATENT DOCUMENTS

| 2,790,618 A | * | 4/1957 | Hauser ....................... 248/507 |
| 3,165,163 A | * | 1/1965 | Holka ........................ 180/68.5 |
| 3,429,534 A | * | 2/1969 | Bean et al. ................. 248/500 |
| 4,228,978 A | | 10/1980 | Rand |
| 4,367,572 A | * | 1/1983 | Zielenski ..................... 24/301 |
| 4,368,863 A | * | 1/1983 | Gentile ..................... 248/117.7 |
| D296,520 S | * | 7/1988 | Spinetta ....................... D8/373 |
| 5,062,184 A | * | 11/1991 | Rowland .................... 24/16 PB |
| 5,116,014 A | * | 5/1992 | Slavens et al. .............. 248/500 |
| 5,222,701 A | * | 6/1993 | Rowland .................... 248/74.3 |
| 5,330,233 A | | 7/1994 | Kress |

* cited by examiner

Primary Examiner—Leslie A. Braun
Assistant Examiner—Naschica S. Morrison
(74) Attorney, Agent, or Firm—Richard C. Litman

(57) ABSTRACT

The RV sewage line stabilizing device is used to secure an elbow fitting, affixed to the end of an RV sewer hose, in place in a sewer receptacle. A bottom plate has a U-shaped collar formed in one end, and an open, three-sided box formed on the other end. The RV sewage line stabilizing device lays generally flat in close proximity to the ground, with the U-shaped collar fitting around the vertically extending portion of the elbow fitting. The U-shaped collar may rest on top of a flange formed around the elbow fitting, or a retaining strap may be secured over the horizontally extending portion of the elbow fitting to hold the elbow fitting down and in place. The open, three-sided box holds a brick, or other weights, in place to provide weight to secure and stabilize the elbow fitting, keeping the sewer hose in place.

5 Claims, 6 Drawing Sheets

RV SEWAGE LINE STABILIZING DEVICE

BACKGROUND OF THE INVENTION

1. Field of the Invention

The present invention relates to the field of recreational vehicle (RV) waste disposal, and more particularly to an RV sewage line stabilizing device for securely retaining an RV sewage line in connection with an in-ground sewer receptacle.

2. Description of the Related Art

Recreational vehicles (RVs) are a popular means of vacation travel, providing both a vehicle for travel and a comfortable living space. RVs often provide comfortable and convenient facilities, such as running water, showers and toilet facilities. Waste from these facilities must, of course, be dealt with. RVs commonly have a waste holding tank to receive and contain waste while the RV is operated away from a campground or other location where waste may be discharged. From time to time, the RV must visit a facility where the waste holding tank may be emptied into a sewer receptacle.

Additionally, RVs are frequently used in a fixed location for an extended duration. Campgrounds and RV parks often provide sewer receptacle facilities so that waste may be discharged into the sewer receptacle instead of being contained in the holding tank.

In either situation, a sewer hose connection is used to connect the RV's plumbing to the sewer receptacle, either emptying the holding tank or discharging waste directly into the sewer receptacle. The sewer receptacle is often simply a round opening flush with, or close to, ground level, where the RV's sewer hose is inserted. A four-inch PVC pipe commonly forms the sewer receptacle.

The sewer hose running from the RV to the sewer receptacle is generally a 3½-inch flexible hose. The end of the sewer hose, or an elbow-shaped fitting attached to the end of the sewer hose, is simply inserted loosely in the sewer receptacle, often with no means other than gravity to hold the hose in place. Thus a problem exists in the risk that the hose may be accidentally dislodged from the sewer receptacle, allowing the discharging waste to spill onto the ground. The accidental discharge of the RV's waste onto the ground in a campsite, or at a holding tank emptying facility, creates a clearly unpleasant mess that is to be avoided if at all possible.

RV operators often attempt to secure the sewer hose in the receptacle by piling rocks, logs, bricks, cinderblocks, or other heavy items on the hose or the elbow fitting to prevent dislodgement. Some RV operators gather rocks and the like for the purpose at each new campsite, while others carry rocks or a brick, cinderblock, or log in their RV for use at each new campsite. In addition to the inconvenience of having to find or carry a suitable object to hold the sewer line in place, the method of simply piling heavy objects on the sewer line to hold the sewer line in place is often ineffective, as the rocks, bricks, cinderblocks, logs, and other weights are prone to falling out of position.

Other devices have been fashioned to attempt to secure the RV sewer line in place.

U.S. Pat. No. 5,330,233, issued on Jul. 19, 1994 to J. Kress, discloses a recreational vehicle sewer apparatus that is a weighted collar for attaching to an end of a drain hose. The apparatus is a cast iron attachment in the form of a hollow cylinder ring, divided into two halves that are releasably connected together. In use, the apparatus is closed around the end of a sewer hose, securely gripping the sewer hose with a few inches of hose extending beyond the apparatus. The hose extending beyond the apparatus is inserted into the sewer receptacle, and the weight of the apparatus holds the hose in place. While this apparatus may be readily attached to the expandable vinyl hose typically used for an RV sewer hose, it is not useful where the hose is terminated with an elbow fitting.

Other devices serve to support the sewer hose between the RV and the sewer receptacle. U.S. Pat. No. 4,228,978, issued on October 21 to R. Rand, discloses a recreational vehicle sewer hose support. Since the sewer hose usually is flexible, it is prone to sagging or bending between the RV and the sewer receptacle. Such sagging or bending may contribute to a tendency for the hose to move and disengage from the sewer receptacle. The sewer hose support cradles the length of the hose from the RV to the sewer receptacle to prevent the hose from sagging or bending. While this may eliminate some tendency for the hose to move and disengage from the sewer receptacle, merely supporting the hose does not serve to more securely hold the hose or elbow fitting in place in the sewer receptacle.

None of the above inventions and patents, taken either singly or in combination, is seen to describe the instant invention as claimed. Thus an RV sewage line stabilizing device solving the aforementioned problems is desired.

SUMMARY OF THE INVENTION

The RV sewage line stabilizing device holds an RV sewer hose, terminated with an elbow fitting, in place in a sewer receptacle. Elbow fittings are frequently used at the end of the RV sewer hose to connect the sewer hose, which is often run flat along the ground, to the sewer receptacle, which is generally a piece of four-inch PVC pipe oriented vertically at or near the ground level. The elbow fitting thus forms the transition from the horizontal sewer hose to the vertical sewer receptacle, having a horizontally extending portion and a vertically extending portion.

The RV sewage line stabilizing device has a bottom plate that has a U-shaped collar formed in one end. On the other end of the bottom plate, side walls form an open, three-sided box.

The box end functions to hold a brick, rocks, or other weights in place to hold the RV sewage line stabilizing device in position.

The U-shaped collar is adapted to slide around the vertically extending portion of the elbow fitting as it engages in the sewer receptacle. The bottom plate lies generally flat on or near the ground, with the receptacle-engaging end of the elbow extending vertically through the U-shaped collar.

The RV sewage line stabilizing device holds the sewer hose in place in either of two ways. A number of the elbow fittings commonly used have a flange formed around each end of the fitting. Used with such an elbow fitting, the U-shaped collar is fitted above the flange around the receptacle-engaging end of the elbow fitting. The flange is wider than the U-shaped collar, so the U-shaped collar retains the elbow fitting in place. Other elbow fittings have no flange to be retained by the collar. In this case, a retaining strap, such as a bungee cord or a strap with a hook and loop fastener, i.e, Velcro or other fastener, extends over the horizontal portion of the elbow fitting to secure the RV sewage line stabilizing device to the elbow fitting.

In either such arrangement, the weights placed in the box end of the RV sewage line stabilizing device help to anchor the elbow fitting in place, and the box walls prevent the weight from falling or being knocked out of place.

Accordingly, it is a principal object of the invention to provide an RV sewage line stabilizing device to prevent an RV sewer hose from becoming dislodged from a sewer receptacle during use.

It is another object of the invention to provide an RV sewage line stabilizing device that can be used with a variety of fittings commonly used on RV sewer hoses.

It is a further object of the invention to provide an RV sewage line stabilizing device that facilitates the use of various weights to prevent an RV sewer hose from becoming dislodged from a sewer receptacle during use.

Still another object of the invention is to provide an RV sewage line stabilizing device that prevents weights being used to hold an RV sewer hose in position from falling or being knocked out of place.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
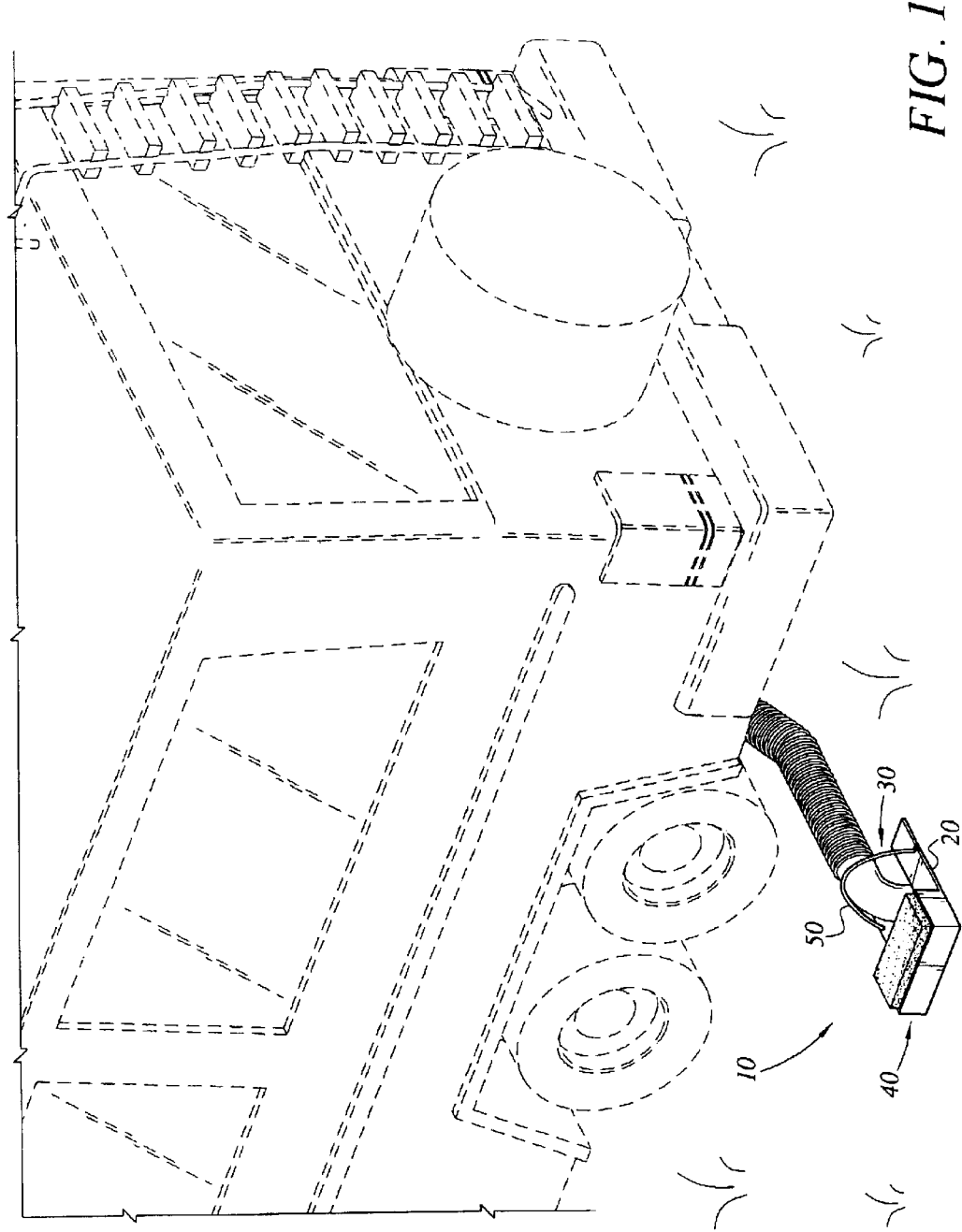
FIG. 1 is an environmental, perspective view of an RV sewage line stabilizing device according to the present invention.

The present invention is an RV sewage line stabilizing device, designated generally as 10 in the drawings. The RV sewage line stabilizing device 10 is designed to engage with an elbow fitting on the end of a sewer hose in order to secure the elbow fitting in place in a sewer receptacle. Elbow fittings have a vertically extending portion that is placed into the sewer receptacle. The elbow fitting forms a right-angle bend with a horizontally extending portion that connects to the sewer hose, which typically extends horizontally along the ground to the RV.

As seen in FIG. 1, the RV sewage line stabilizing device 10 has a bottom plate 20 that has a U-shaped collar 30 formed in one end, and an open, three-sided box 40 formed on the other end. With the RV sewage line stabilizing device 10 lying generally flat, and in close proximity to the ground, the U-shaped collar 30 fits around the vertically extending portion of the elbow fitting. The U-shaped collar 30 may rest on top of a flange formed around the elbow fitting, or a bungee cord 50 may be secured over the horizontally extending portion of the elbow fitting to hold the elbow fitting down and in place. The open, three-sided box 40 holds a brick, or other weights, in place to provide weight to secure and stabilize the elbow fitting, keeping the sewer hose in place.

Figure 2:
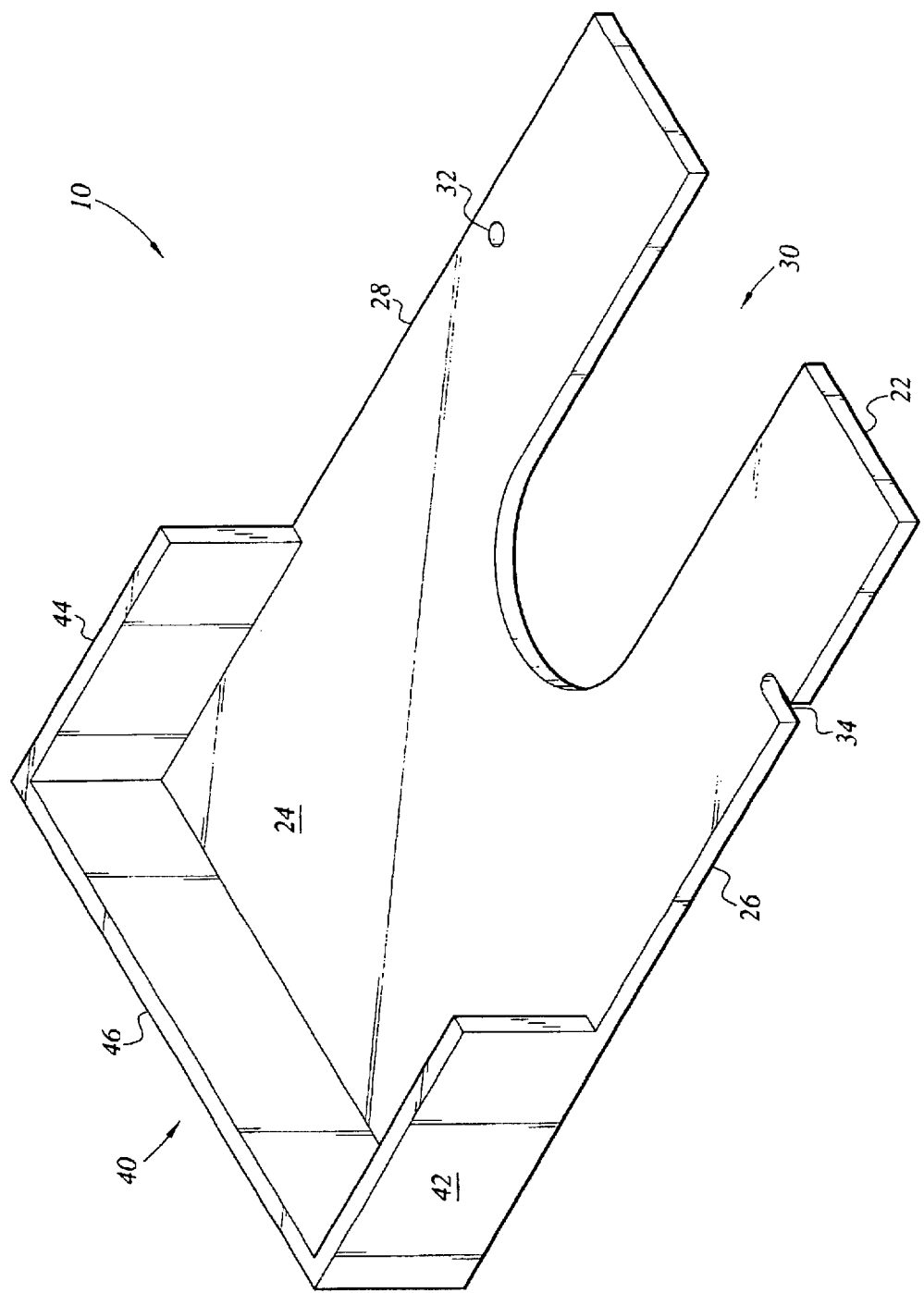
FIG. 2 is a perspective view of an RV sewage line stabilizing device according to the present invention.
Figure 3:
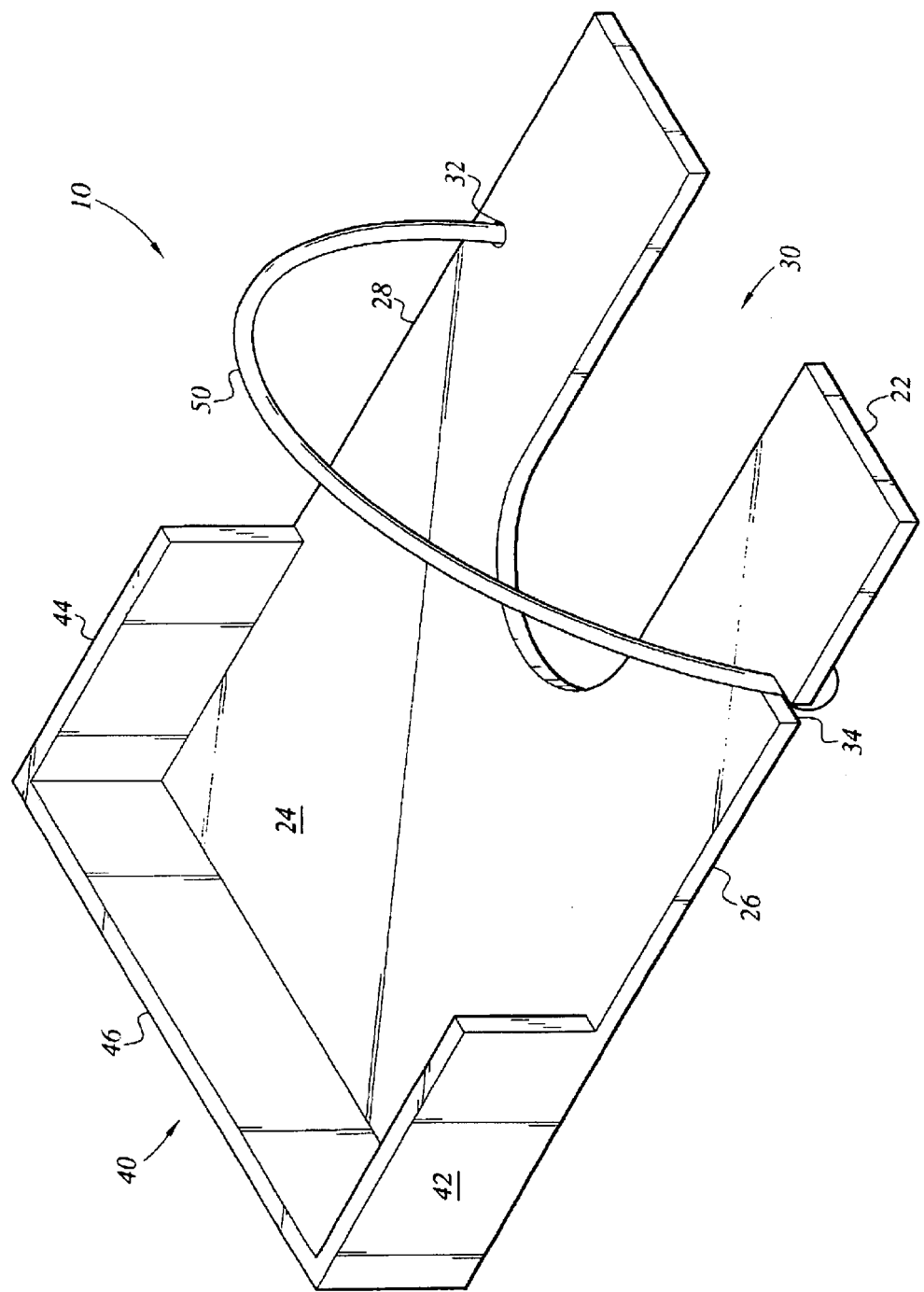
FIG. 3 is a perspective view of an RV sewage line stabilizing device according to the present invention, with a bungee cord engaged.
Figure 4:
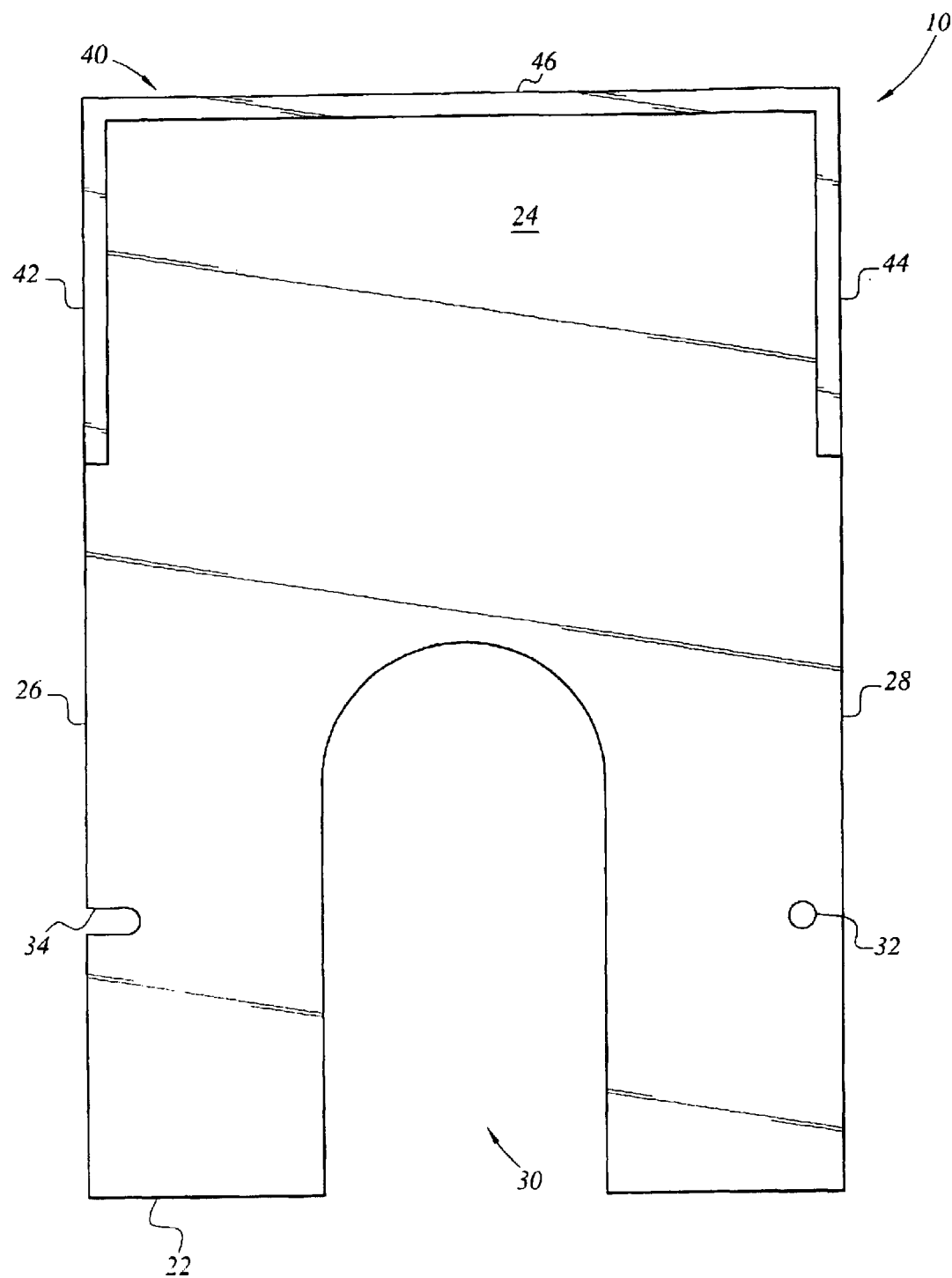
FIG. 4 is a top view of an RV sewage line stabilizing device according to the present invention.

Referring to FIGS. 2–4, it can be seen that the bottom plate 20 is a generally rectangular, flat, planar sheet of a rigid material such as plastic, hard rubber, metal, or wood. The bottom plate 20 has a collar end 22 and a box end 24, and first and second edges 26, 28. A U-shaped collar 30 is formed in the collar end 22 of the bottom plate 20. The size of the U-shaped collar 30 is sufficient to accommodate the elbow fittings commonly used for RV sewer hook-ups. A U-shaped collar 30 that is three inches wide and six inches deep will accommodate most common RV sewer fittings.

The three-sided box 40 is formed by an end wall 46, disposed on the box end 24 of the bottom plate 20, along with first and second side walls 42, 44, disposed on the first and second edges 26, 28 of the bottom plate 20, respectively. The side walls 42, 44 adjoin the end wall 46 to form the open, three-sided box 40 on the box end 24 of the bottom plate 20. The open, three-sided box 40 may be formed having length, width, and height dimensions to accommodate a standard brick having dimensions of 7¾ inches in length by 3⅞ in width by 2¼ in height. Alternate dimensions may better suit other weighting objects and materials.

Figure 5:
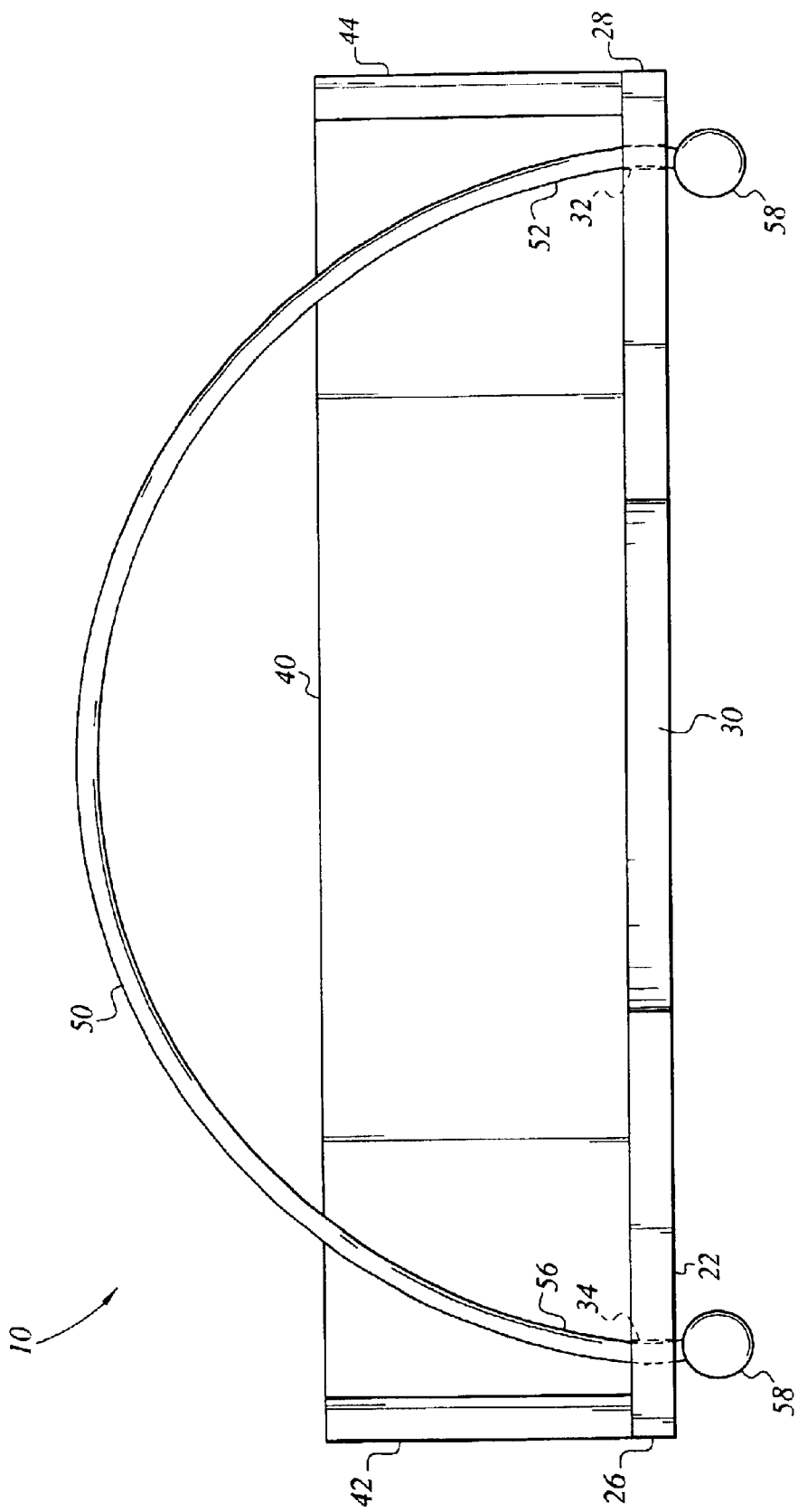
FIG. 5 is a front elevational view of an RV sewage line stabilizing device according to the present invention, with a bungee cord engaged.

A retaining strap is used to retain the elbow fitting in relation to the RV sewage line stabilizing device 10. The retaining strap may be a single piece of an elastic material, such as an elastic cord 50, as seen in FIG. 5

The elastic cord 50 has first and second ends 52, 56, with first and second retainers 58 formed in or fastened to each of the first and second ends 52, 56. Each retainer may be a knot tied in an end 52, 56 of the elastic cord 50, or a bead, pin, or another device affixed to an end 52, 56 of the elastic cord 50 to prevent the end from pulling out of a hole or slot.

The first end of the elastic cord 50 is fitted through an aperture 32, formed through the bottom plate 20 adjacent to the first edge 26, and retained in place by the first retainer 58. A slot 34 is formed through the bottom plate 20 adjacent to the second edge 28. The second end 56 of the elastic cord 50 may be freely engaged with, and disengaged from, the slot 34. When the second end 56 of the elastic cord 50 is engaged with the slot 34, it is retained in place by the second retainer 58.

Figure 6:
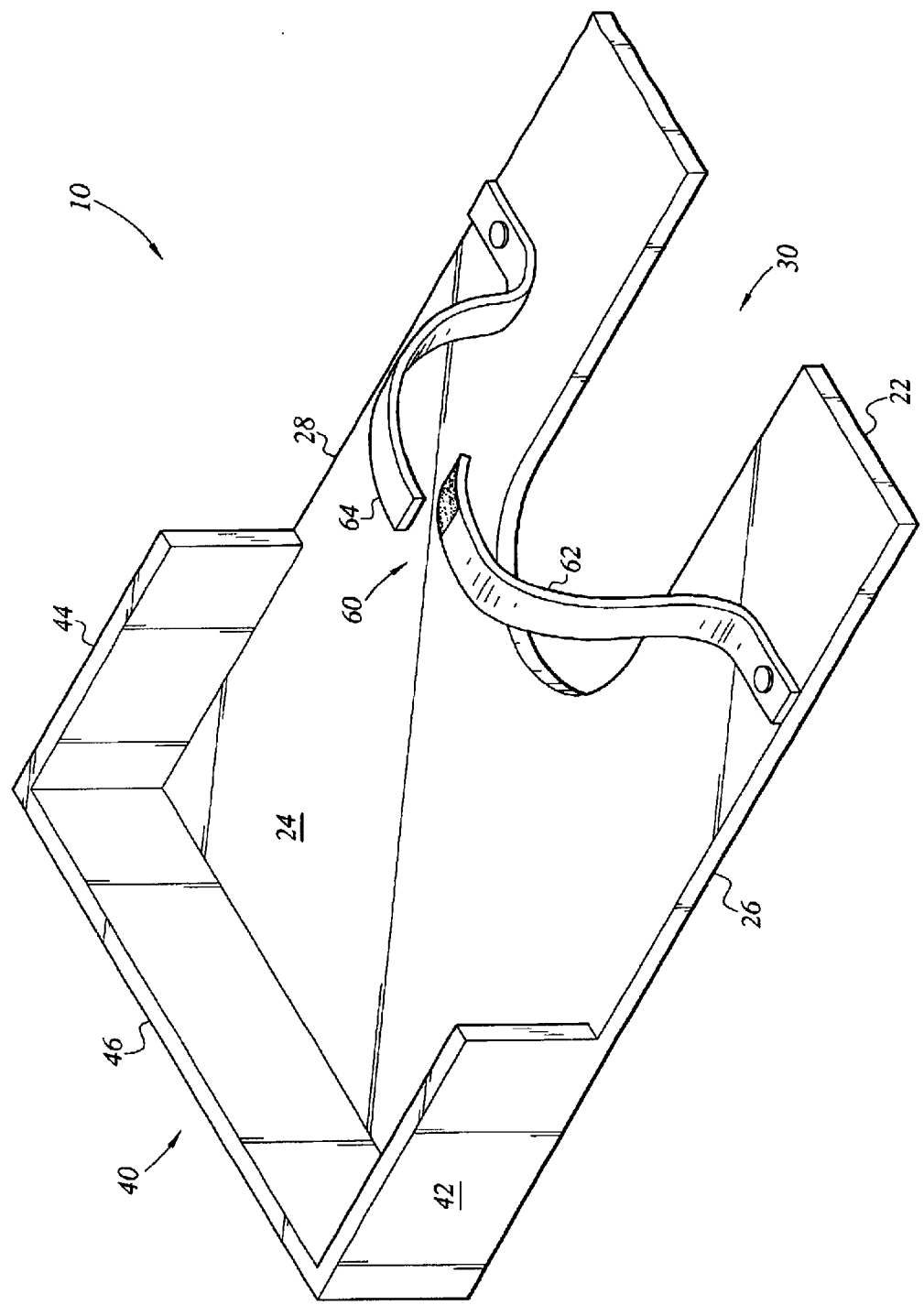
FIG. 6 is a perspective view of an RV sewage line stabilizing device according to the present invention with a hook and loop fastener (Velcro) retaining strap.

In alternative embodiments, the retaining strap may be made of cloth, plastic, leather, or any other suitable material. The strap may be formed in one piece or two, with a suitable clasp, buckle, or other fitting or device to secure the retaining strap. FIG. 6 illustrates the retaining strap in the form of a hook and loop fastener, i.e. Velcro, strap 60. The hook and loop fastener (Velcro) strap 60 has first and second strap halves 62, 64. Each of the strap halves 62, 64 has a first end that is fastened to the bottom plate. Second ends of the strap halves 62, 64 may be joined together to secure the hook and loop fastener (Velcro) strap 60 across the U-shaped collar.

Thus, the present invention provides a simple and economical device for stabilizing and RV sewage line in a sewer receptacle.

It is to be understood that the present invention is not limited to the embodiment described above, but encompasses any and all embodiments within the scope of the following claims.

I claim:

1. An RV sewage line stabilizing device, comprising:

a bottom plate, the bottom plate being a generally rectangular, flat, planar sheet of a rigid material, the bottom plate having first and second edges, a collar end and a box end, the collar end having a U-shaped collar formed therein;

an end wall disposed on said box end;

first and second side walls, disposed on said first and second edges respectively, the first and second side walls joining said end wall; and a retaining strap disposed on said bottom plate and extending generally across said U-shaped collar, said retaining strap including a length of elastic cord having first and second ends with first and second retainers disposed at the first and second ends, the first end of the elastic cord being fitted through an aperture formed in said bottom plate and being retained in place by the first retainer, the second end of the elastic cord being freely engageable with and releaseable from a slot formed in said bottom plate;

wherein said end wall, first side wall, and said second side wall form an open, three-sided box on said box end of said bottom plate; and wherein said plate is adapted for being placed on a horizontal surface adjacent a sewer receptacle, an elbow terminating an RV sewage line adapted to extend through the U-shaped collar and into the sewer receptacle, said box being adapted for receiving a weight.

2. The RV sewage line stabilizing device according to claim 1, wherein said bottom plate, said end wall, and said side walls are made from plastic.

3. The RV sewage line stabilizing device according to claim 1, wherein said bottom plate, said end wall, and said side walls are made from hard rubber.

4. The RV sewage line stabilizing device according to claim 1, wherein said bottom plate, said end wall, and said side walls are made from metal.

5. The RV sewage line stabilizing device according to claim 1 wherein said bottom plate, said end wall, and said side walls are made from wood.

* * * * *